Figure 1:
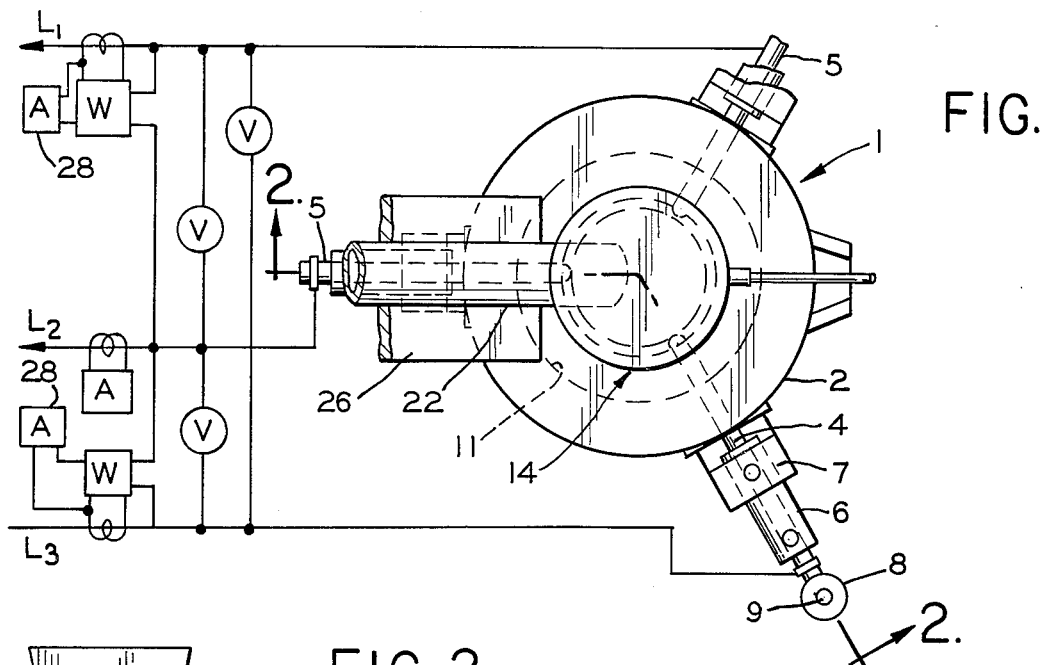

United States Patent [19]

Segsworth et al.

[11] 4,006,284
[45] Feb. 1, 1977

[54] EXTENDED ARC FURNACE AND PROCESS FOR MELTING PARTICULATE CHARGE THEREIN

[75] Inventors: Robert Sidney Segsworth, Toronto; Charles Benjamin Alcock, Don Mills, both of Canada

[73] Assignee: Tibur Metals, Ltd., Toronto, Canada

[22] Filed: June 2, 1975

[21] Appl. No.: 580,839

[30] Foreign Application Priority Data

Apr. 16, 1975 Canada .............................. 224734

[52] U.S. Cl. .................................. 13/9 R; 13/33
[51] Int. Cl.² ................................. H05B 11/00
[58] Field of Search .................. 13/9, 33, 18

[56] References Cited
UNITED STATES PATENTS

| | | | |
|---|---|---|---|
| 3,101,385 | 8/1963 | Robinson | 13/18 X |
| 3,105,864 | 10/1963 | Robinson | 13/9 |
| 3,789,126 | 1/1974 | Brusa | 13/33 X |

*Primary Examiner*—R. N. Envall, Jr.

[57] ABSTRACT

The furnace and process disclosed herein comprise an extended arc furnace having at least one electrode with an axial opening therein through which an appropriate gas, such as argon, may be fed into the extended arc, and a substantially vertical reaction zone above the extended arc through which a particulate charge is fed by gravity into the extended arc zone and in its downward course through the reaction zone the particulate charge is heated and, if desired, a reaction such as reduction may be effected. The rate of gas flow upward in the reaction zone is slow enough to permit free falling of the particulate charge but fast enough to suspend the particles for the heating and reaction time desired. The axial electrode opening or openings are of a size to permit creation of a stabilized extended arc and to give reduced electrode consumption, improved current and voltage wave forms, and the furnace power may be modulated by changing either the rate of gas flow or the composition of the gas. The feeding of the gas internally into the arc gives the extended arc a stability not achievable by other methods of feeding the gas to the arc volume.

20 Claims, 3 Drawing Figures

EXTENDED ARC FURNACE AND PROCESS FOR MELTING PARTICULATE CHARGE THEREIN

BACKGROUND OF THE INVENTION

1. Field of the Invention

This invention relates to electric arc furnaces. More specifically it relates to an extended arc furnace employing at least one electrode with an axial opening through which an appropriate gas, such as argon, may be introduced. Still more specifically the furnace embodies a vertical reaction chamber through which a particulate charge is fed by gravity into the extended arc zone and in its course through the reaction chamber is heated and, if desired, reacted.

2. Related Prior Art

The conversion of iron ore to iron is still being conducted primarily in blast furnaces. In spite of numerous attempts to design more simple equipment which is economical on a small scale for this purpose, blast furnaces are still being used to handle about 98% of the world's production of iron.

One attempted method to circumvent the use of the blast furnace for this purpose is known as the Strategic-Udy process. This involves the use of a large, substantially horizontal rotary kiln which performs the same fuel-burning and most of the ore-reduction operation which is effected in the blast furnace. The product is dropped continuously into an electric furnace to melt it for pouring into ingots. Here again the equipment is cumbersome and expensive to operate as evidenced by the fact that it has not been commercially adopted to any substantial extent.

Electric shaft furnaces have also been attempted in which the tuyeres at the bottom of the blast furnace have been replaced by an electric arc furnace to provide the heat for melting the reduced product after the conglomerate charge has passed downward through the reducing zone of the blast furnace-like vertical shaft. This has likewise met with little commercial success.

British Patent No. 1,102,900 suggests the use of a plasma torch furnace for reducing a conglomerate mineral charge in which the conglomerate charge has been moved downward and counter-current to a stream of reducing gases emanating from the plasma torch so as to preheat the charge and the reduction is effected in the slowly moving column by a reducing gas such as methane or other hydrocarbon through an annular passage surrounding the electrode or electrodes in the plasma furnace and directed so that the reducing gas is ionized before it passes into the conglomerate to perform its reducing function.

This process resembles blast furnace operation in that reducing gases are passed upward through a descending column of conglomerate iron ore and the reduction is performed in this descending column. In the blast furnace the reduced charge is being melted at the bottom of the column where intense heat is generated by combustion whereas in the process of the patent the reduced conglomerate charge is melted at the bottom of the column by the plasma torches. This process also has some of the disadvantages of the blast furnace because of the cumbersome, expensive equipment required. In this process the ore must be agglomerated, and the composition must be carefully controlled with a relatively high percentage of iron being present in the ore. Moreover plasma torches are expensive and difficult to maintain.

U.S. Pat. No. 3,834,895 shows another process using a plasma arc furnace. In that case, particulate iron-bearing material is dropped into the plasma from a hopper situated immediately above the furnace. A gas such as argon is fed into the furnace through an annular passageway surrounding either the hopper or the electrode. The gases are exited from the furnace through an outlet at the top of the furnace without coming into contact with the charge prior to entry of the charge into the furnace. The patentee stresses as novel the feature of collecting the melted iron at the bottom of the furnace and removing it in a molten form. No mention is made of a reducing operation nor is any reducing agent mentioned or provided for in the description of the process. Moreover no mention or provision is made for the removal of slag that would be produced in an ore reduction operation. Furthermore the arc is highly unstable.

U.S. Pat. No. 3,783,167 discloses a cumbersome mechanical device designed to produce an extended arc zone by moving an electrode or a plasma gun in a closed path so that the resultant arc would be moved into greater volume. In addition to being cumbersome and difficult to maneuver, this equipment is quite inefficient from an energy consumption aspect.

STATEMENT OF THE INVENTION

In accordance with this invention it has been found that improvements in operation and in economy for the reaction or smelting of a particulate charge, such as iron ore fines, can be effected by the arc furnace design and process for operation which are described herein. The improved design is based primarily on the stabilized extended arc made possible by the incorporation of at least one electrode having an axial opening through which an appropriate gas, such as argon, is fed into the arc. The furnace design also features a vertical shaft positioned above the extended arc so that the particulate charge may be fed by gravity directly into the stabilized extended arc after it has been preheated and prereacted to some extent by intimate contact with gas rising through the vertical shaft. The size of the opening in the electrode or electrodes is selected to give an appropriate rate of gas flow therethrough.

It has been found that this stabilized extended arc operation results in (1) reduced electrode consumption, (2) improved power factor, (3) improved heat transfer, (4) improved power control, (5) reduced refractory wear, and (6) reduced acoustical and electrical noise.

The flow pattern of the gas in the interior of the arc allows the arc to be extended, that is by increase of the distance between arcing electrodes or between an electrode and the melt in the hearth, and imparts to the extended arc a stability not attainable by other means. Prior art arcs are erratic in performance, must be maintained at relatively short lengths and are not capable of being extended to the degree and with the stability attained in the furnace of this invention. By the improved character and nature of the stabilized extended arc of the furnace of this invention greater arc volumes are available to perform the functions described herein and the passage of particulate matter through the extended arc is less likely to cause extinction or erratic behavior that is characteristic of prior art systems. The stabilized extended arc obtained in this new furnace is diffused and of greater height and cross-sectional area than previously attainable.

In establishing the stablized extended arc, the electrode can be spaced from a second electrode or from material in the hearth a short distance normally used in initiating an arc with solid electrodes. Then the electrical power is applied to initiate the arc, following which the gas flow through the electrode is started. The resulting ionization of the gas in the arc lowers the electrical resistance and the electrode is then withdrawn at least double and generally many times more the original length of the arc. If the gas is introduced in any manner other than through the axial opening in the electrode the resultant arc does not have the stabilized extending effect accomplished by feeding in through the axial opening. When the arc is between two or more electrodes, it is only necessary to have an opening in one electrode although it may be preferred to have openings in more than one and even in all the electrodes.

Since it is advantageous to present as broad a horizontal cross-sectional area as possible to the falling particulate matter it is preferred to have the arc or arcs formed between electrodes horizontally spaced from each other rather than between an electrode and the material in the hearth, which type of arcing presents a more vertical pattern and thus presents a smaller area through which the falling particles may pass.

The number of electrodes and the arrangements thereof will vary according to the size and capacity of the furnace. For example it is possible to have a considerable number of electrodes set in a horizontal plane with half the electrodes extending inwardly from one side of the furnace and the other half extending inwardly from the opposite side. With the arcs extending between each opposing pair of electrodes, a considerably stabilized, extended arc area may be formed of a large horizontal pattern through which a larger amount of particulate matter may be passed. Where it may be desirable to extend the arc area vertically it is possible to arrange pairs of electrodes horizontally opposed from each other but at different heights so that one or more pairs may be vertically positioned over one or more other pairs so that the resultant stabilized extended arc may have a greater vertical dimension through which the particulate matter will have a greater vertical distance to pass and thereby have a greater residence time in the arc volume.

While this improved furnace has great potential use in the reduction of metallic oxides such as iron ore to iron and in the melting of the metal such as iron or steel, there are many other potential uses such as in the recovery of alloys, for example, ferrochrome, ferrovanadium, ferromolybdenum, etc., the treatment of slags from which titania, alumina, etc. may be recovered, the calcining or roasting of various materials from which carbon dioxide, water and other volatile materials are to be removed, the spherodizing of metal and metal compound particles particularly of high melting metals, zirconia, etc., the removal of non-metals such as sulfur and phosphorus, sulfide and phosphorus-containing substances respectively, the distillation of zinc and lead from plant waste dusts containing these, the cracking and reforming of hydrocarbons to give ethylene and other volatile hydrocarbons or of complex oxides to yield simple oxides, the recovery of metal values in metallized slags and other non-metallic substances such as glass by the passage of such materials through the reaction chamber together with a particulate collector metal, and the like.

Moreover, while blast furnaces require that ore fines or other particulate iron sources should be pelletized or sintered before being used and usually are used for the reduction of relatively high grade ores, the furnace of this invention is capable of using such fines or particulate materials with no pretreatment. For example, it can use much lower grade ores including those which contain larger quantities of water of crystallization than are required for economical operation in the blast furnace. This makes possible the use of many particulate materials for which there has not been heretofore a convenient or economical method of handling. Furthermore the use of ores in particle form permits a shorter reaction time in effecting reduction, and by use of argon or other inert gas, air is displaced from the furnace thereby allowing better control of the chemistry of the reactor. Also, this furnace has the added advantage of eliminating carbon from the zone of greatest reactivity, unlike the situation in submerged arc furnaces where it is impossible to produce low carbon products since the carbon or graphite electrodes extend into or are submerged in the material contained in the hearth. In the extended arc arrangement of this invention, the electrodes are removed from this very active area and it is possible to produce iron, titania, etc. with low carbon.

SPECIFIC EMBODIMENTS OF THE INVENTION

The furnace of this invention is probably more easily described by reference to the drawings wherein:

FIG. 1 shows a top view and

Figure 2:
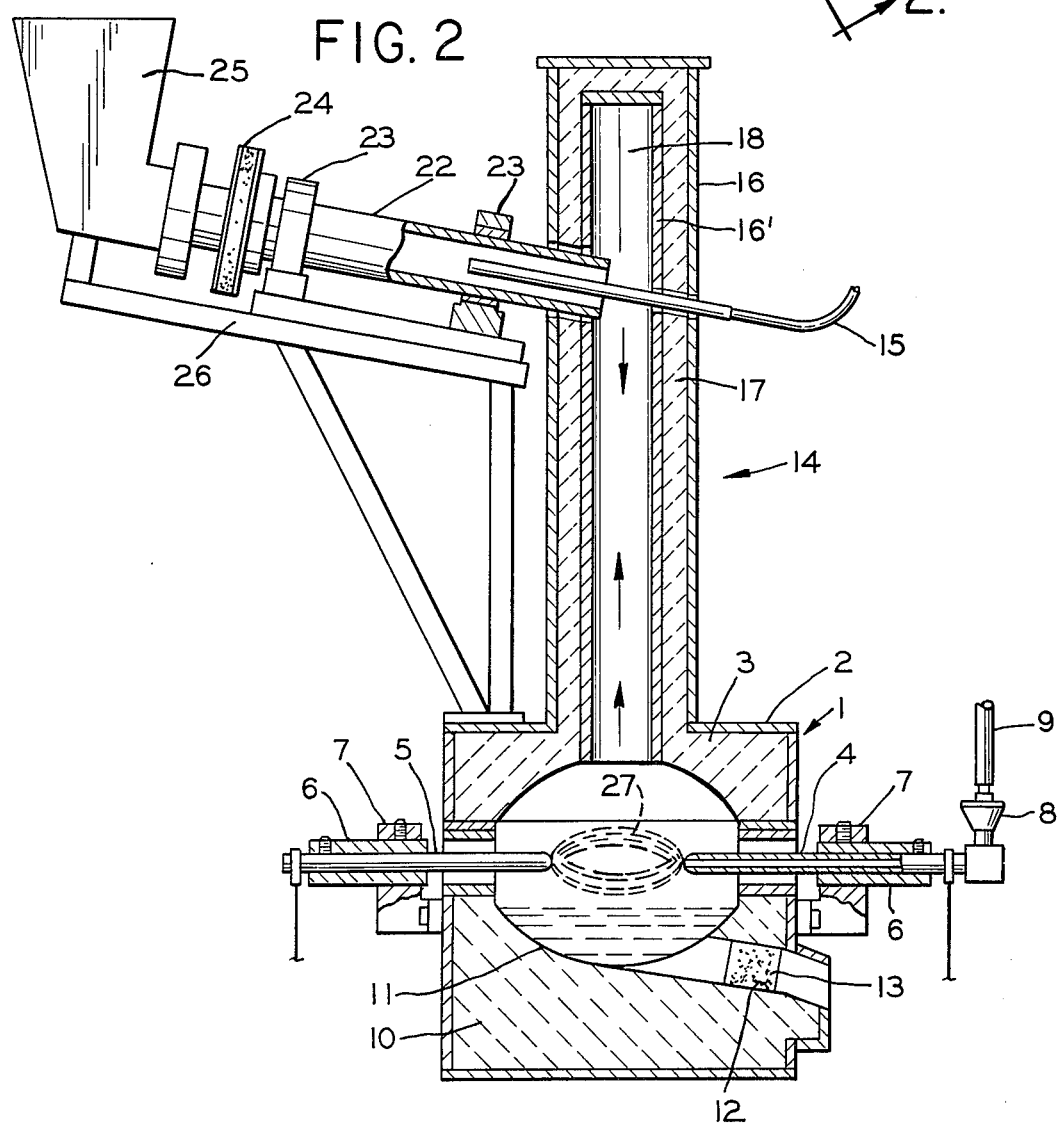

FIG. 2 a sectional verticle view of a furnace comprising the furnace proper together with a reaction chamber and preheater attached.

Figure 3:
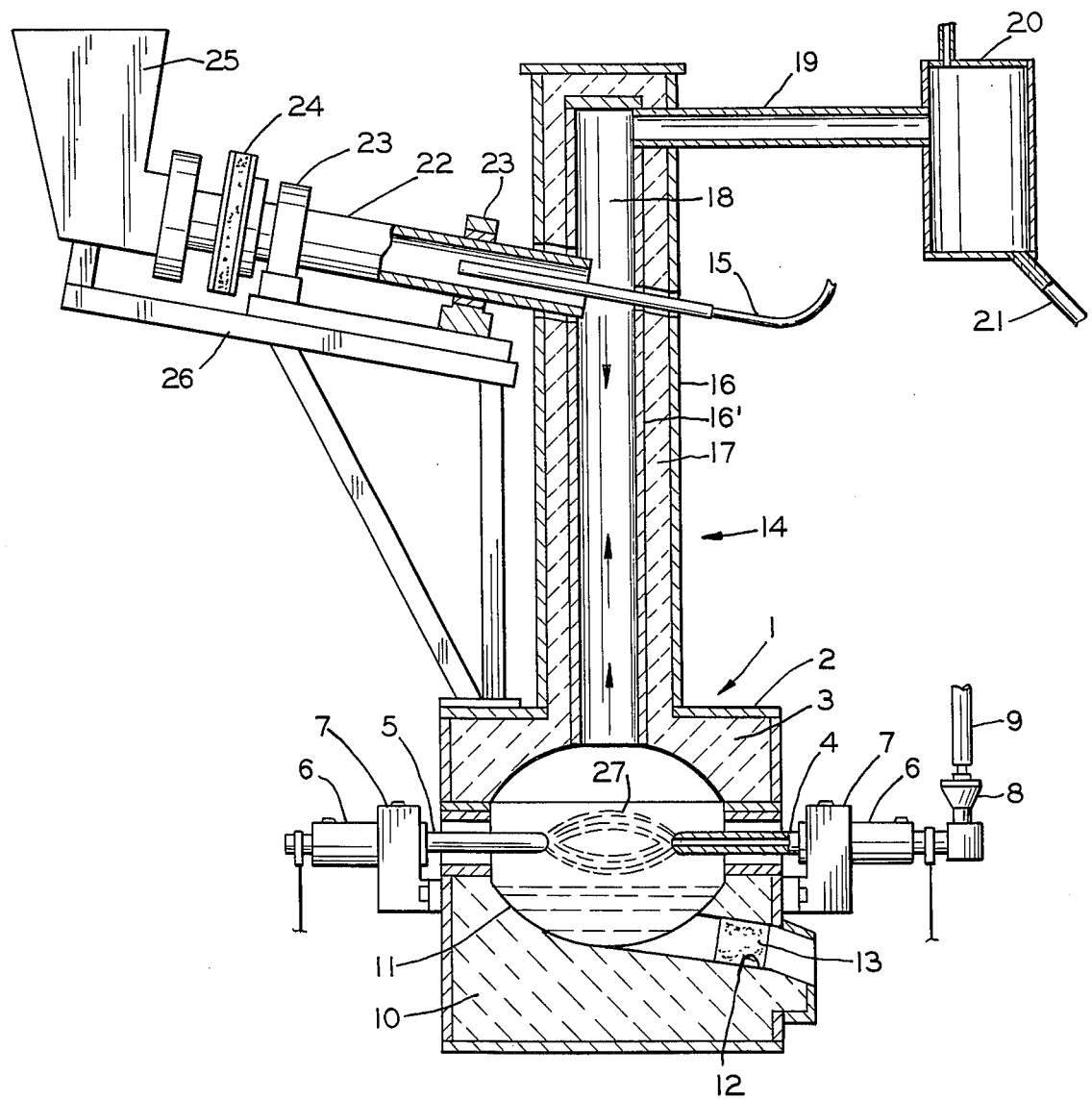

FIG. 3 shows a modification of the furnace of FIGS. 1 and 2.

In FIGS. 1 and 2, the furnace 1 has an outer shell 2 with refractory interlining, with electrode 4 having an axially extending opening of predetermined size and electrode 5, which may have an axial opening therein or be solid, both extending into the furnace. The electrodes are disclosed as insulated by supports 6 which are attached to the outer furnace body by brackets 7. Connector 8 feeds gas into electrode 4 from the supply line 9 and into the arc 27. Molten product collects in the hearth 11 formed in the furnace refractory base 10, and may be removed through opening 12 by removal of plug 13. Reaction chamber 14, as shown, extends upward from the hearth with outer and inner shells 16 and 16' insulated from each other by packing 17. The particular configuration of the furnace as shown is not essential to the invention and other appropriate forms and modifications of furnace may be used. The passageway 18 afforded by the reaction chamber permits the upward passage of gas from the arc area and opposed-directional passage of particulate material downward from the preheater 22. This preheater is supported by rings 23 and, if desired, rotated through wheel 24. Particulate charge is fed into the preheater through hopper 25 which is supported by platform 26. The amount of heating effected in the preheater is less than at which will cause agglomeration of the particles leaving the preheater. Gas passing upward may exit from the reaction chamber into preheater 22 and out through hopper 25 or by other means not shown. Additional heat may be introduced into preheater 22 by igniting CO or other combustible present in the gas by introducing air through nozzle line 15. Power source 28 supplies power to the electrodes. Other gases, such as hydrogen, may be inserted by inlets (not shown) at various points in the reaction chamber to effect chemical reactions.

FIG. 3 shows one form of a modification of the top of reaction chamber 14 whereby gas is fed by conduit 19 into condenser 20 from which condensed liquid may be removed through outlet 21. Uncondensed gas may be exhausted from the upper region of condenser 20 and either fed to the preheater if there is sufficient combustible gas therein, such as CO, or may otherwise be treated or discharged into the atmosphere. The conduit 19 can be positioned below the preheater if a substance of only moderate volatility is to be collected.

The electrodes are preferably made of carbon or graphite, although other suitable materials may be used such as tungsten and the size may be whatever is appropriate to accommodate the size and design of furnace being used. The electrode opening must be present in one and may be in more or all of the electrodes. The electrodes may be positioned horizontally, vertically or inclined and they may be arranged so that the arcing is effected between two or more electrodes or between the electrode or electrodes and the metal in the collecting hearth. The size of the electrode opening or openings is determined in such a manner as to give the desired gas flow rate. The desired overall gas flow rate will vary according to the size of the furnace, the production capacity of the furnace, the nature of the particulate feed material and the nature of the gas. The electrodes are fastened in such a manner that the spacing for the arc may be adjusted for initiating arcing and maintaining the extended arc as well as to adjust the arc to compensate for consumption of the electrodes.

In addition to argon, various other gases may be used such as helium, nitrogen, carbon monoxide, methane, chlorine, etc., as well as mixtures thereof. However each gas differs somewhat in the effect produced and the appropriate rate of feed should be adjusted accordingly. The specific gas may be tested very easily to determine the appropriate rate of flow to produce the desired effect in the extended arc.

Generally the amount of gas introduced from the electrode or electrodes, together with the gas emanating from the reduction reaction whereby carbon dioxide and carbon monoxide are generated, is sufficient to suspend the particles in the reaction chamber or at least impede their downward passage sufficiently to give the desired residence time. However, if desired, additional gas to serve this purpose may be introduced in the lower regions of the reaction chamber, in which case a gas, preferably a reducing gas such as carbon monoxide or hydrogen is introduced.

The construction of the furnace proper may be similar to that of conventional arc furnaces using a refractory material where there will be exposure to extremely high temperatures or molten metal and where desired for extra strength an outer shell of steel or other appropriate metal may be used. The thickness of the refractory and the size of the furnace hearth will vary according to the design capacity of the furnace. Furnaces having capacities up to 400 tons of metal and even higher may be used. The power sources are similar to those used in other electric arc furnaces.

The reaction chamber may also be constructed of refractory on the interior where it will be exposed to hot gases. Since the upper portion of the shaft will be exposed to lower temperatures than the lower portion adjacent to the furnace proper, the upper portion may be of a less heat-resistant type of refractory than used in the lower section. For example in a typical type of operation the temperature in the furnace hearth may be about 1,500° C, in the lower part of the shaft about 1,200° C and in the upper part of the shaft about 800° C. The temperature in the extended arc may be in the order of 5,000° C.

The length or height and diameter or width of the reaction chamber will vary according to the size and capacity of the furnace. However the length of the reaction chamber is designed to give a residence time for the descending particles sufficient for the desired amount of heat transfer from the rising gas to the descending particles and also the desired amount of reaction. The residence time of the particles in the reaction chamber depends upon many factors including initial size and weight of the particles, type and rate of flow of gas, temperature distribution in the shaft, etc. Where reduction or other type of reaction is being conducted with respect to the particles during their descent, the extent of reaction during the descent likewise depends on a number of factors such as the size and nature of the particles, the residence time in the reaction chamber, the temperature distribution in the reaction chamber, the amount of ionization, of the argon, etc., flow rate of the gas, etc. For example finer particles will permit a shorter reaction time and the reduction of iron oxide in hematite or magnetite will proceed at a considerably different rate from the reduction of ilmenite or of alumina-rich ores. Larger particles will require a faster flow of gases in the reaction chamber to maintain the particles in suspension. However, these conditions are easily determined and adjusted according to the various factors involved.

These factors will influence the design of the reaction chamber with respect to allowing sufficient residence time for the particulate matter and also influence the flow rate and type of gas used. Moreover, while a preheater of the type shown in FIG. 2 is preferred, it is also possible to omit the preheater by providing a reaction chamber of greater length so that the preheating may be effected in the higher, initial passage through the chamber. However, it is preferred to effect as much preheating as possible before the particles start their passage through the reaction chamber so that the residence time in the chamber may effect more complete reaction. It is advantageous to achieve the highest degree of reduction during the descent through the chamber since this utilizes to a more efficient extent the heat in the gas and reduces the amount of reduction or other reaction to be effected in the extended arc and in the hearth, and also the amount of energy, reactants and time spent in the hearth for completion of reaction.

In a typical operation under preferred conditions, it is found that at least 50% preferably at least 60%, of an iron ore reduction has been effected by the time the ore particles have reached the bottom of the reaction chamber. The remainder of the reduction is effected in the arc zone and in the melt collected in the hearth.

In the reaction zone, the reduction of iron ore is effected primarily by carbon monoxide in the gases rising from the hearth and arc zone as well as that generated in the reaction zone by the reaction of carbon particles with carbon dioxide also contained in the gases. When the oxide reduction is being completed in the arc zone and in the hearth, carbon reacts with the oxide to generate carbon monoxide which in turn effects reduction in the reaction zone.

Where a preheater is used as shown in FIG. 2, the preheater may be constructed of various materials, such as steel, which are capable of withstanding the much lower temperatures therein for example up to 600°–900° C. The temperatures to which the charge may be preheated depends somewhat on the nature of the charge since the temperature should not be high enough to cause agglomeration or sintering and thereby adversely affect the free-flowing properties of the charge. The preheater is equipped with an exit through which the gases effecting the preheating may be discharged. These gases may be led to a washer or cooler for condensing or recovering desired portions thereof or may be exhausted to a stack or chimney for emission directly into the atmosphere, or may be combusted to recover valuable heat energy therefrom.

Where it is desired to preheat the charge to a higher degree than effected by the gas emanating from the furnace it is possible to introduce air into the preheater to burn combustible components in the gas, such as CO, or a mixture of air and combustible gas, such as methane, may be introduced by a nozzle means.

The passage of the charge through the preheater may be expedited by having it inclined sufficiently to have the charge slide down by force of gravity, and possibly assisted by vibration. By having the preheater in cylindrical shape and having it rotated the passage may be uniformly effected. Where the preheater is omitted, a hopper or conveyor or other type of feeding device may be used to feed the particulate charge directly to the reaction chamber.

It is generally desirable to control the rate of exit of gases from the preheater or reaction chamber in accordance with the rate of gas flow and linear velocity desired in the reaction chamber. It may be desirable to have a limited amount of free space in the preheater to retard gas flow or to have the gases exit through a hopper maintained full enough with charging material to impede gas passage therethrough.

Typical particulate charges that may be used in the extended arc furnace include fly ash, steel mill dust, flue dust, mill scale, iron ore fines, such as ilmenite, hematite, magnetite, chromite, limonite, laterite, etc.

The particulate material is advantageously of a size in the range of 48 mesh to −400 mesh (Tyler) or 38 to 295 microns. The particulate charge may also contain as reducing agents: low grade coal, anthracite, coke, sawdust, etc.

The slag produced in the processing of some of these ores may be recovered and processed for recover of valuable components, such as titania and alumina. For example, tests have shown that it is possible to recover titania from a slag obtained from ilmenite, somewhat similar to that produced in Example III, by leaching processes which give as high as 85% of the titania present in the form of a product containing 80% or more pure TiO.

As previously indicated, the furnace may be used also to process sulfide ores and phosphorus-containing ores to recover valuable components therefrom. Furthermore by the addition of alloying components either to the molten metal in the furnace hearth or as ores in the particulate feed for simultaneous reduction, alloy steels may be produced directly in this furnace.

In addition to performing various reactions as described above, it is also possible to use the furnace of this invention for melting purposes using various metal dusts or particles that may be available as scrap material. In this way it is possible to use the heat exchange features of the furnace for preheating the metal particles on their way down the reaction chamber, thereby reducing the time required in melting. This melting operation may be performed as a continuous process by periodic or continuous removal of the molten metal from the hearth.

In the particulate charge being added to the preheater, or directly to the reaction chamber, there are included various materials other than the particulate matter to be acted upon, such as slag formers, reducing agents, alloying agents, etc., depending on the functions to be performed. The amounts of these materials correspond to the amounts used in similar operations in other types of equipment and may be calculated accordingly. For example the amount of carbon to be added for reduction of an ore may be calculated stoichiometrically on the oxide content of the ore. In all cases these reagents or modifying agents must be in particulate form and of an appropriate size to give the desired residence time in the reaction chamber in accordance with the conditions to be maintained therein.

The invention is illustrated by the following examples which are intended merely for purpose of illustration and are not to be regarded as limiting the scope of the invention or the manner in which it maybe practiced. Unless specifically indicated otherwise, parts and percentages are given by weight.

EXAMPLE I

A furnace is used having the design shown in FIGS. 1 and 2 except for having three electrodes spaced around the circumference of the furnace 120° from each other and entering the interior of the furnace at an angle pointing downward of about 60° with the wall of the furnace. The tips of the electrodes are about 4 inches from the bottom of the hearth and the hearth is 9 inches in diameter. The electrodes are made from graphite rods having a one inch diameter and a starting length of 24 inches. A 0.0625 inch (1/16 inch) diameter hole is drilled through the longitudinal axis of each electrode. These electrodes are installed in the furnace in a manner that permits adjustment of the inserted lengths of electrodes and the upper ends are connected to an argon supply through appropriate fittings. The reaction chamber has an inside diameter of 3 inches and a height of 2 feet to the point where the end of the preheater enters the reaction chamber. A number of thermocouples are positioned in the interior of the chamber wall spaced from each other along its length. The preheater comprises primarily a steel cylinder having an inside diameter of 2.5 inches, a length of 2.5 feet and an inclination of 15° with the horizontal. It is supported near each end on graphite bearing devices which permit rotation of the cylinder about its linear axis. The cylinder is rotated by means of a belt driven wheel fixed radially around its upper end. The charge is added to the preheater by a hopper and vibrating feeder which discharges into the upper end of the preheater.

A three-phase, 60 hertz power source is connected to the electrodes and argon fed into the electrodes and the flow through the openings of the electrodes adjusted until the desired stabilized extended arc length is attained. As soon as the furnace has stabilized at the desired temperature, introduction of the particulate charge to the preheater is initiated. This charge comprises a flue dust/mill scale, having the analysis and sizing given below. Since sufficient carbon is already in the flue dust/mill scale, as indicated below, to serve as reducing agent, no additional carbon powder is required. Over a period of 5 hours 125 lbs. of this waste oxide mixture is reacted. The amount of argon used is 15 cu. ft. (stp.).

| Flue Dust/Mill Scale Analysis | | Sizing (Tyler mesh) | | | |
|---|---|---|---|---|---|
| Fe | 50% | On | 6 | Mesh | .83% |
| CaO | 3.5% | | 10 | Mesh | 4.6% |
| MgO | 2.23% | | 12 | Mesh | 5.3% |
| MnO | 1.25% | | 20 | Mesh | 9.6% |
| $Al_2O_3$ | .08% | | 28 | Mesh | 12.9% |
| | | | 35 | Mesh | 18.6% |
| $SiO_2$ | 5.04% | | 48 | Mesh | 24.9% |
| | | | 65 | Mesh | 41.5% |
| $CO_2$ | 2.60% | | 150 | Mesh | 49.7% |
| | | | 200 | Mesh | 55.9% |
| C | 12.62% | | 325 | Mesh | 64.5% |
| S | .21% | Thru | 325 | Mesh | 35.5% |
| Zn | .45% | | | | |
| $H_2O$ | 2.51% | | | | |
| $K_2O$ | .20% | | | | |
| Pb | .04% | | | | |
| Moisture | 12% | | | | |

During this run 65 lbs. of iron are produced having the analysis:

| Carbon | 4.03% |
|---|---|
| Silicon | 2.5 |
| Sulphur | .029 |
| Manganese | .9 |
| Phosphorus | .06 |
| Copper | .05 |

EXAMPLE II

The procedure of Example I is repeated using a charge of 35 lbs. of magnetite (a concentrate from fly ash) together with 7 lbs. of crushed coke of −30 mesh. The magnetite analysis and probable compound composition are:

| MAGNETITE ANALYSIS | | PROBABLE COMPOUND COMPOSITION | |
|---|---|---|---|
| Iron | 57.4% | Magnetite ($Fe_3O_4$) | 79.3% |
| Silica | 10.3 | Silica | 10.3 |
| Aluminum | 3.0 | Alumina | 5.7 |
| Sulphur | 0.21 | Carbon | 0.26 |
| Carbon | 0.26 | Titanium Dioxide | 0.38 |
| Titanium | 0.20 | Potassium Sulphate | 0.29 |
| Potassium | 0.13 | Sodium Sulphate | 0.28 |
| Sodium | 0.09 | Manganese Sulphate | 0.03 |
| Magnesium | 0.07 | Magnesium Sulphate | 0.35 |
| Manganese | 0.02 | Nickel Oxide | 0.08 |
| Nickel | 0.02 | Calcium Oxide | 0.01 |
| Calcium | 0.01 | | 96.98% |

A yield of 17 lbs. of iron is obtained which includes:

| Carbon | 3.42% |
|---|---|
| Silicon | 3.46 |
| Manganese | .093 |
| Sulphur | .17 |
| Phosphorus | .033 |
| Copper | .039 |
| Zinc | .023 |
| Lead | .072 |
| Tin | 10 ppm |

EXAMPLE III

The procedure of Example I is repeated using 165 lbs. of an ilmenite concentrate together with 23 lbs. of crushed coke of −30 mesh. The yield is 47 lbs. of iron and 103 lbs. of a titaniferrous slag. The analyses of the ilmenite and of the products are as follows:

| Ilmenite concentrate: | Fe = 36.0, $TiO_2$ = 26.0, $SiO_2$ = 15.5. |
|---|---|
| Slag product: | Fe = 12.75, $TiO_2$ = 40.0, $SiO_2$ = 25.5. |
| Iron product: | C = 2.84, Si = 2.2, |
| | Cu = 0.165, S = 0.14, Ti = 0.11, |
| | Pb = 0.1, Mn = 0.093, P = 0.044, |
| | Zn = 0.024, Sn = 0.002. |

EXAMPLE IV

The procedure of Example I is repeated using a mixture of 6.5 lbs. of chromite and 1 lb. of powered graphite with a carbon monoxide injection of 5 cu. ft. per hour. A yield of 3 lbs. of ferrochrome alloy is obtained having in addition to iron: 20% Cr, 3.3%C, 236 ppm oxygen, and 28 ppm nitrogen.

EXAMPLE V

The procedure of Example I is repeated a number of times with similar results using in place of the magnetite an equivalent weight respectively of finely divided
  a. Magnetite ore fines;
  b. Hematite ore fines;
  c. Laterite ore fines.

EXAMPLE VI

The procedure of Example I is repeated a number of times with satisfactory results using in place of the argon an approximately equivalent amount of
  a. Nitrogen
  b. Helium
  c. Carbon monoxide
  d. Methane The foregoing examples illustrate the manner in which reactions of various types may be conducted using various modifications in the types of ores or starting compounds and accompanying reagents or modifiers that are added with the ore, etc. as particulate matter. It is also possible to introduce reagents at various points in the reaction chamber such as reactive gases or liquids vaporized at the temperatures of the reaction chamber. These may be used to perform desired reactions with the particulate matter during contact therewith in the reaction chamber.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims:

The invention claimed is:

1. A furnace adapted for the heat treatment of particulate matter comprising
  1. a refractory-lined vessel having one or more openings adapted to receive one or more electrodes extending into the interior of said vessel, having a hearth therein adapted to receive said treated matter, a discharge means for removing said treated matter from said hearth, and an opening in the upper region of said vessel;

2. a reaction chamber rising from said vessel having a passageway through the length thereof, said reaction chamber having an upper portion and inlet means in said upper portion for transmitting the particulate matter to be heat treated into said passageway, said passageway communicating with the opening in the upper region of said vessel, both for receiving gases heated by electrodes in said vessel and rising into said passageway, to direct said gases and said particulate matter into a counter-current heat exchange relationship, and for feeding the heated particulate matter through said upper region opening in said vessel;

3. one or more electrodes, at least one of which has an axial opening extending through at least a major portion of the length of said electrode and communicating with the interior of said vessel, said axial opening having a size predetermined to create a stabilized extended arc according to the flow rate and linear velocity of gas flowing through said opening;

4. a means for supplying the selected gas to the axial opening in said electrode or electrodes whereby to feed said gas into the interior of said vessel; and 5. a power supply connected to said electrode adapted to supply sufficient power to produce an extended arc between said electrode and one or more other electrodes or between said electrode and a charge in the hearth of said vessel wherefore the rate of gas flow and linear velocity of the gas stabilizes the said extended arc.

2. The furnace of claim 1 which includes a means for adjusting the position of said electrode or electrodes to lengthen the said arc.

3. The furnace of claim 1 having a preheater communicating with the upper end of the passageway in said reaction chamber adapted to preheat a particulate charge fed into one end of said preheater and to discharge the preheated particulate charge from the opposite end into said reaction chamber passageway.

4. The furnace of claim 3 in which said preheater comprises a cylindrical shell slightly inclined to the horizontal and adapted to be rotated about its longitudinal axis.

5. A process for the melting or reaction of a particulate charge in an apparatus including a vessel defining a hearth, and a reaction chamber including a passageway extending upwardly from said vessel, said process comprising the steps of 1. preheating said charge to a temperature of at least 600° C.;
2. heating a gas in said vessel to cause the heated gas to rise from the vessel and through the passageway while passing said preheated charge downward through said passageway whereby said particulate charge is further treated by heat exchange with said rising gas;
3. establishing an electric arc with at least one electrode, and extending and stabilizing said arc by passing gas through an opening in the electrode forming said arc, and dropping said heated particulate charge through said arc; and
4. collecting the resultant molten product below said extended arc.

6. The process of claim 5 in which the said preheating is conducted to a temperature below that at which the particulate matter agglomerates.

7. The process of claim 5 in which said particulate charge is a metal ore.

8. The process of claim 7 in which said metal ore charge is mixed with a solid reducing agent.

9. The process of claim 8 in which said reducing agent is carbon in a finely divided form.

10. The process of claim 5 in which said metal ore is an iron ore.

11. The process of claim 10 in which said iron ore is mixed with carbon in a finely divided form.

12. The process of claim 11 in which the arc-extending gas is argon.

13. The process of claim 12 in which said iron ore is magnetite.

14. The process of claim 12 in which said iron ore is hematite.

15. The process of claim 12 in which said iron or is laterite.

16. The process of claim 12 in which said iron ore is chromite.

17. The process of claim 11 in which the arc-extending gas is nitrogen.

18. The process of claim 11 in which the arc-extending gas is helium.

19. The process of claim 11 in which the arc-extending gas is carbon monoxide.

20. The process of claim 11 in which the arc-extending gas is methane.

* * * * *